United States Patent
Stevens et al.

(10) Patent No.: US 7,130,750 B1
(45) Date of Patent: Oct. 31, 2006

(54) FLOW METER WITH MAGNETORESISTIVE SENSORS AND METHOD OF MEASURING FLOW

(75) Inventors: Robert K. Stevens, Racine, WI (US); Jonathan Ray McClain, Milwaukee, WI (US); Richard Little, Racine, WI (US)

(73) Assignee: Racine Federated, Inc., Racine, WI (US)

( * ) Notice: Subject to any disclaimer, the term of this patent is extended or adjusted under 35 U.S.C. 154(b) by 3 days.

(21) Appl. No.: 11/086,049

(22) Filed: Mar. 22, 2005

(51) Int. Cl.
*G01F 1/24* (2006.01)

(52) U.S. Cl. .................. 702/64; 702/45; 73/861.58; 73/861.08; 73/861.54

(58) Field of Classification Search .............. None
See application file for complete search history.

(56) References Cited

U.S. PATENT DOCUMENTS

| | | | |
|---|---|---|---|
| 3,805,611 A | | 4/1974 | Hedland |
| 4,429,276 A | | 1/1984 | Narimatsu et al. |
| 4,480,611 A | * | 11/1984 | Wendt ..................... 123/197.5 |
| 4,487,077 A | * | 12/1984 | Lake ....................... 73/861.58 |
| 5,433,118 A | | 7/1995 | Castillo |
| 5,520,058 A | * | 5/1996 | Campbell et al. ........ 73/861.08 |
| 5,677,476 A | | 10/1997 | McCarthy et al. |
| 6,113,642 A | * | 9/2000 | Petrofsky et al. ............. 623/24 |
| 6,279,406 B1 | | 8/2001 | Li et al. |
| 6,367,366 B1 | * | 4/2002 | Bloom et al. ................. 92/5 R |
| 6,850,849 B1 | * | 2/2005 | Roys ........................... 702/45 |
| 2004/0045368 A1 | * | 3/2004 | Schoeb ..................... 73/861.08 |

OTHER PUBLICATIONS

Honeywell Sensor Products—Linear/Angular Rotary Displacement Sensors HMC 1501/HMC 1512 (Aug. 2000).
Honeywell Sensor Products—Application Note AN211—Applications of Magnetic Position Sensors (Jan. 2002).
Honeywell Sensor Products—HMR4007 Linear Position Sensor Module.
Bratland et al.—Linear Position Sensing Using Magnetoresistive Sensors.
Anderson—Getting the Most out of Delta-Sigma Converters.

\* cited by examiner

*Primary Examiner*—Carol S. W. Tsai
(74) *Attorney, Agent, or Firm*—Wood, Phillips, Katz, Clark & Mortimer

(57) ABSTRACT

A variable area flow meter has a magnet carried by a piston which is moved to a position representing fluid flow. An array of magnetoresistive bridge sensors adjacent the path of magnet movement senses the magnet position. The bridges are unbalanced by the magnet field. The analog unbalance signals are read and processed in digital form to develop a flow signal. The flow meter circuits are powered from a 4–20 MA current loop or a remote power supply. Each bridge sensor is powered only when the bridge unbalance signal is being read, to minimize the power requirement.

23 Claims, 5 Drawing Sheets

FLOW METER WITH MAGNETORESISTIVE SENSORS AND METHOD OF MEASURING FLOW

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

A variable area flow meter as shown in Hedland U.S. Pat. No. 3,805,611 typically has a cylindrical body with an inlet at one end and an outlet at the other. A piston inside the body is spring biased toward the inlet and is moved toward the outlet by fluid flow through the body. A conical plug extends through a hole in the end of the piston and is tapered toward the outlet. As the piston is moved against the spring by increased fluid flow, the opening for flow in the end of the piston grows larger. The piston reaches a stable position in the cylindrical body which is a measure of flow. If the cylindrical body is transparent, a scale on the body indicates the flow.

Where the cylindrical body is not transparent, the Hedland '611 patent incorporates a magnet in the piston with a follower of magnetic material outside the cylindrical body. The follower and a scale indicate the flow. Electrical output signals have been provided by switches with contacts actuated by the follower at selected flow rates. A remote electrical read out is shown in Lake U.S. Pat. No. 4,487,077. A resistor mounted on the cylindrical body is contacted by a wiper carried on the magnet follower and connected with a remote read-out. The meter of the '077 patent is subject to decoupling of the follower from the magnet as a result of rapid change in flow rate and exacerbated by friction between the wiper and the resistor.

BRIEF SUMMARY OF THE INVENTION

The flow meter disclosed herein utilizes an array of anisotropic magnetoresistive (AMR or MR) sensing elements adjacent to the path of travel of the magnet on the flow meter piston. An external follower and wiper are not required. This eliminates the potential for decoupling.

Each of the sensing elements comprises a bridge of four MR elements. The bridge has an unbalance output related to the angle of the field of the magnet with respect to the sensitive axis of the bridge. The unbalance output signals of the bridges are processed to derive a signal representing fluid flow. The output signals are independent of magnet field strength so long as the MR elements are saturated.

A feature of the invention is that the flow sensor comprises a linear array of bridge circuits parallel to the path of flow meter magnet movement, each bridge circuit having four magnetoresistive elements, balanced in the absence of magnetic flux and unbalanced by flux from the magnet, the unbalance being a function of the position of the magnet along the path of movement, a voltage source connected with the bridge circuits, each bridge having an output voltage representing the unbalance of the bridge and a signal circuit responsive to the output voltages of bridges to develop a fluid flow signal. More particularly, the signal circuit includes an analog to digital converter and a processor responsive to the digital signals to develop the fluid flow signal.

Another feature is that a condition measuring meter with a magnet movable along a linear path in accordance with a condition to be measured includes a linear array of bridge circuits of magnetoresistive elements which are unbalanced by flux from the magnet with a current based two-wire remote indicator circuit including a remote power source. A local power supply is connected through the two-wire circuit with the remote power source and provides local power for the condition sensor with a switch circuit connecting the bridge circuits with the local power supply and a signal circuit powered by the local power supply and responsive to the output voltages of the bridges to develop a signal representing the position of the magnet and having a current output section connecting the measured condition signal with the two wire remote indicator system. More particularly, the switch circuit connects only one bridge circuit of the array with the local power supply at a time.

A further feature of the invention is the method of measuring fluid flow which comprises reading the analog unbalance signals of the bridge sensors, identifying the pair of adjacent sensors on each side of the magnet, selecting the sensor closest to the magnet, calculating the position of the magnet with respect of the selected sensor from the unbalance signal of the selected sensor and adding the calculated magnet position to the position in the array of the selected sensor to determine the fluid flow.

Yet another feature of the method is that the unbalance signals are normalized before the pair of adjacent sensors is identified.

A further feature is that the unbalance signals are converted to digital form before they are normalized.

Still another feature is that the validity of the unbalance signal readings is confirmed after identification of the pair of adjacent sensors on each side of the magnet.

Further features and advantages of the invention will be apparent from the following description.

DETAILED DESCRIPTION OF THE INVENTION

Figure 1:
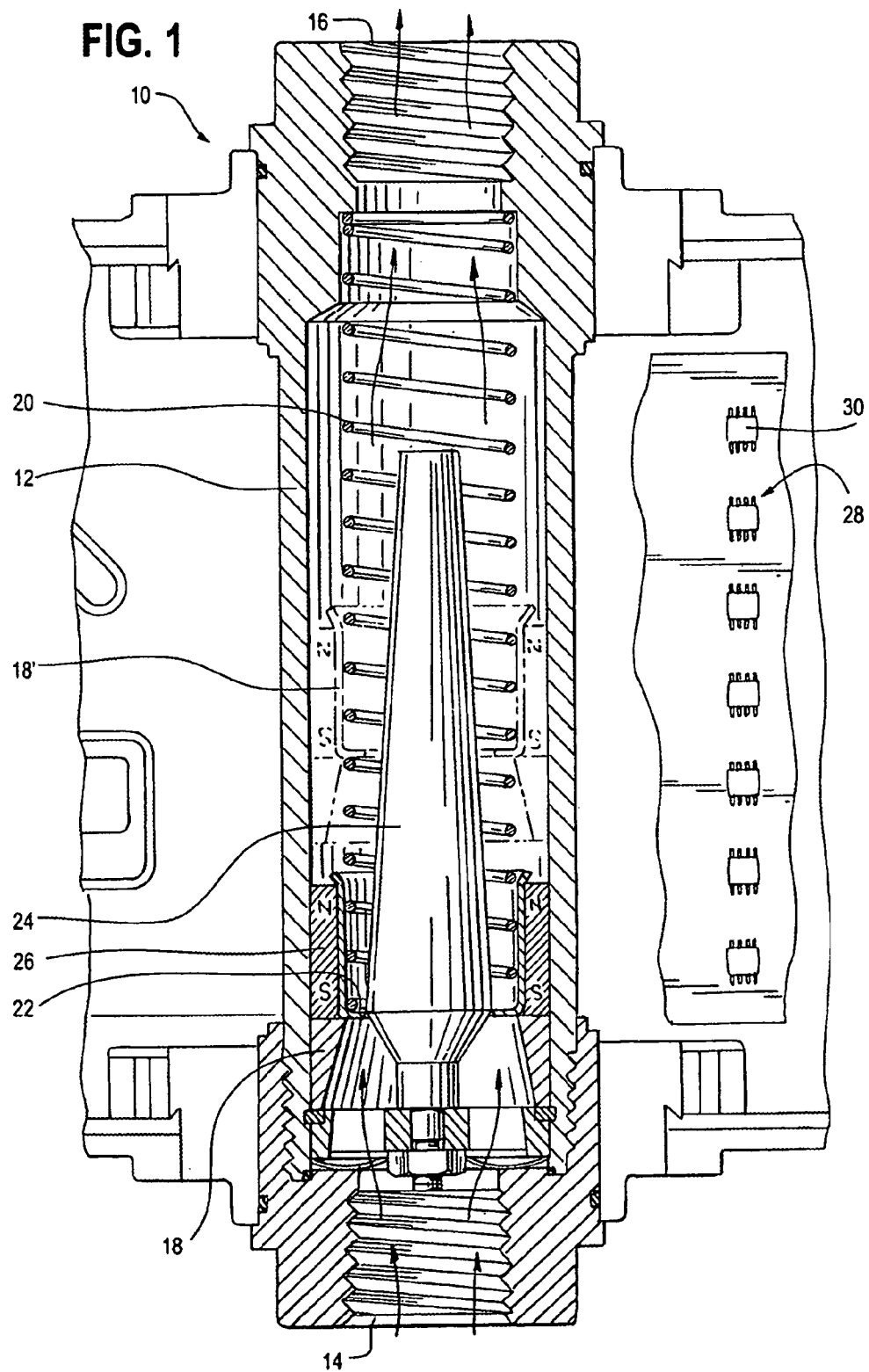
FIG. 1 is a longitudinal section through a variable area flow meter with an array of MR bridge sensors.

A variable area of flow meter 10, of the type shown in Hedland U.S. Pat. No. 3,805,611, is illustrated in FIG. 1.

Cylindrical body 12, of a non-magnetic material, has an inlet 14 and an outlet 16. A piston 18 is biased toward the inlet by spring 20. The piston has a central opening 22 through which a conical plug 24 extends. Fluid flow through the body 12 creates a differential pressure across piston 18 which lifts the piston to a position at which the differential pressure balances the spring force as shown in broken lines at 18'. A magnet 26 is carried on piston 18 and has a field which extends outside cylindrical body 12. The position of magnet 26 and thus of the piston is sensed by an array 28 of MR sensors 30, providing signals from which flow rate of a fluid through the meter may be determined.

Figure 2:
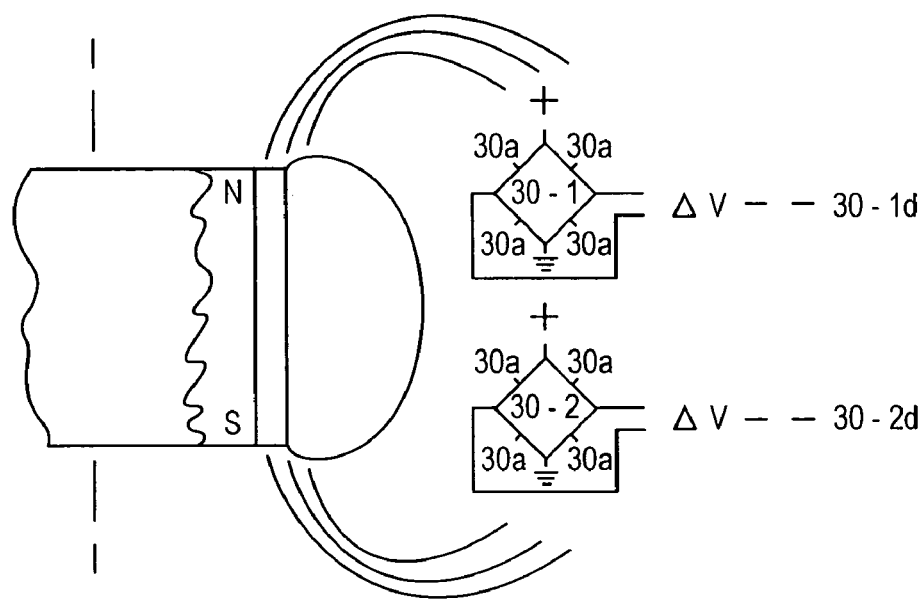
FIG. 2 is a fragmentary diagrammatic illustration of the flow meter piston, magnet and two MR bridge sensors.

A preferred sensor 30 is a bridge circuit of four MR elements, as Honeywell type HMC 1501. Magnet 26 and two sensors 30-1, 30-2 are illustrated in FIG. 2. The four MR elements 30a, 30b, 30c and 30d of a sensor are connected in a bridge circuit and with a DC power source, not shown in FIG. 2. In the absence of a magnetic field, the four MR elements have equal resistance and the bridge is balanced. In the presence of a magnetic field, the resistance of each element varies as a function of sin 2θ, where θ is the angle between the magnetic flux and the current flow through the element. With a magnetic field which saturates the elements, the effect of the field on element resistance is independent of the spacing between the magnet and the sensor. The angle between the magnetic field and the current flow is the same for elements a, d and elements b, c; but differs between elements a, d on one hand and elements b, c on the other hand. The bridge is unbalanced and has an output signal $\Delta V$. The angle of the magnetic field and thus the position of the magnet 26 may be determined from the bridge output signal.

The sensor array 28 adjacent to the path of movement of the flow meter magnet 26 provides output signals from each sensor 30, from which the magnet and piston position and thus flow rate is calculated. The Honeywell HMC 1501 sensor has a linear measuring range of about 0.5". For a flow meter with piston travel of 3", an array of seven sensors spaced apart at 0.5" increments is used. The cylindrical magnet has a length of approximately 13/16" and is magnetized axially so that the axis of the field is parallel with the linear movement of the piston and the magnet and at right angles to the axes of the bridge sensors.

Figure 3:
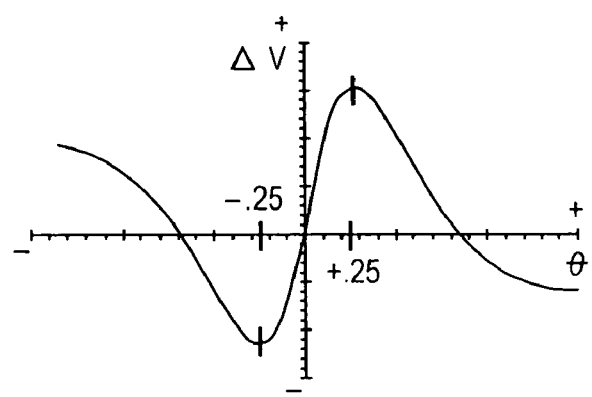
FIG. 3 is a plot of the unbalance voltage $\Delta V$ as a function of the angle $\theta$ between the magnetic field and the reference axis of the sensor or the distance of the magnet from the reference axis.

A plot of the bridge unbalance output voltage, sometimes referred to herein as $\Delta V$, as a function of the angle θ of the magnetic field with respect to the reference axis of the bridge and thus of the magnet position with respect to the bridge, is given in FIG. 3. The relationship of the voltage to field angle is substantially linear between magnet positions from −0.25" to +0.25". The geometry of the magnet and the sensor array is such that only one pair of adjacent sensors will have outputs of both sensors in the linear zone at the same time. This relationship is used in determining the magnet position as described below.

The analog outputs of each of the sensors in array 28 are connected with an analog to digital (A/D) converter 34. The A/D converter acquires each of the analog unbalance output signals and converts them sequentially to a digital format. Preferably, a delta-sigma converter is used which provides significant data resolution and rejection of 50/60 Hz noise. The digital output signals of A/D converter 34 with an identification of the sensor from which each signal is derived are in turn connected with microprocessor 36 which calculates the piston position. The flow rate, or if desired, total flow, is indicated on a display 38 which may be physically mounted on the flow meter 10.

Keyboard 40 connected with microprocessor 36 provides for input as in selection of the mode of operation of the flow meter, calibration of the meter and the input of scaling factors, as discussed below.

In many situations, a flow meter is installed in a location remote from a control center where the flow information is needed. Output circuit 42 provides analog signals for a current output section with 4–20 mA current loop at terminals 44, 46 or voltage output section with a 5 or 10 volt output at terminal 48 with respect to ground terminal 50. A fluid flow signal in pulse width modulated (PWM) format from microprocessor 36 is connected with integrator 52 which develops an analog output signal. For a 4–20 mA output, the loop current at output terminal 46 is controlled by transistor 54. Drive amplifier 56 has an input from integrator 52 with feedback from loop current sensing resistor 58. Amplifier 60 provides a 5 or 10 volt analog output at terminal 48.

With operation in the 4–20 mA current loop output configuration, the signal circuit including the sensor array 28, A/D converter 34, microprocessor 36 and output circuit 42, is powered from the current loop. The voltage drop from the signal current across isolation diode 62 and 5 volt voltage regulator 64 is approximately 5.5 volts DC. The voltage regulator 66 provides 3.3 volts DC for sensor array 28, A/D converter 34 and microprocessor 36.

When operating in the 5/10 volt output configuration, a third wire is required connecting terminal 44 with a remote voltage source of at least 13 volts. Voltage regulator 68 provides 12 volts voltage for amplifier 60.

The 4–20 mA current loop can provide about 2 mA for sensor circuit operation. The analog/digital converter 34, microprocessor 36, display 38, and output circuit 42, including the voltage regulators 64 and 66, require approximately 1.2 mA. Each MR sensor 30 draws 0.66 mA at 3.3 volts. If all seven sensors 30 in array 28 are powered simultaneously, the current requirement is too great. In accordance with the invention, each sensor bridge $MR_1$–$MR_N$ is connected with ground through a normally open Mosfet transistor switch $70_1$–$70_N$. The switches are turned on and off sequentially by sensor select signals from microprocessor 36. When a switch, as $70_1$ is turned on, the circuit for sensor bridge $MR_1$ is completed. The output signal from the activated sensor is captured by A/D converter 34 and a digital value corresponding to the output signal is connected to microprocessor 36. The sensor select signals identify the sensor which provides each output signal. After all sensors have been activated and the unbalance voltages react, the process is repeated. Microprocessor 36 calculates the piston/magnet position and the corresponding flow rate from a set of the sensor output signals.

Figure 4:
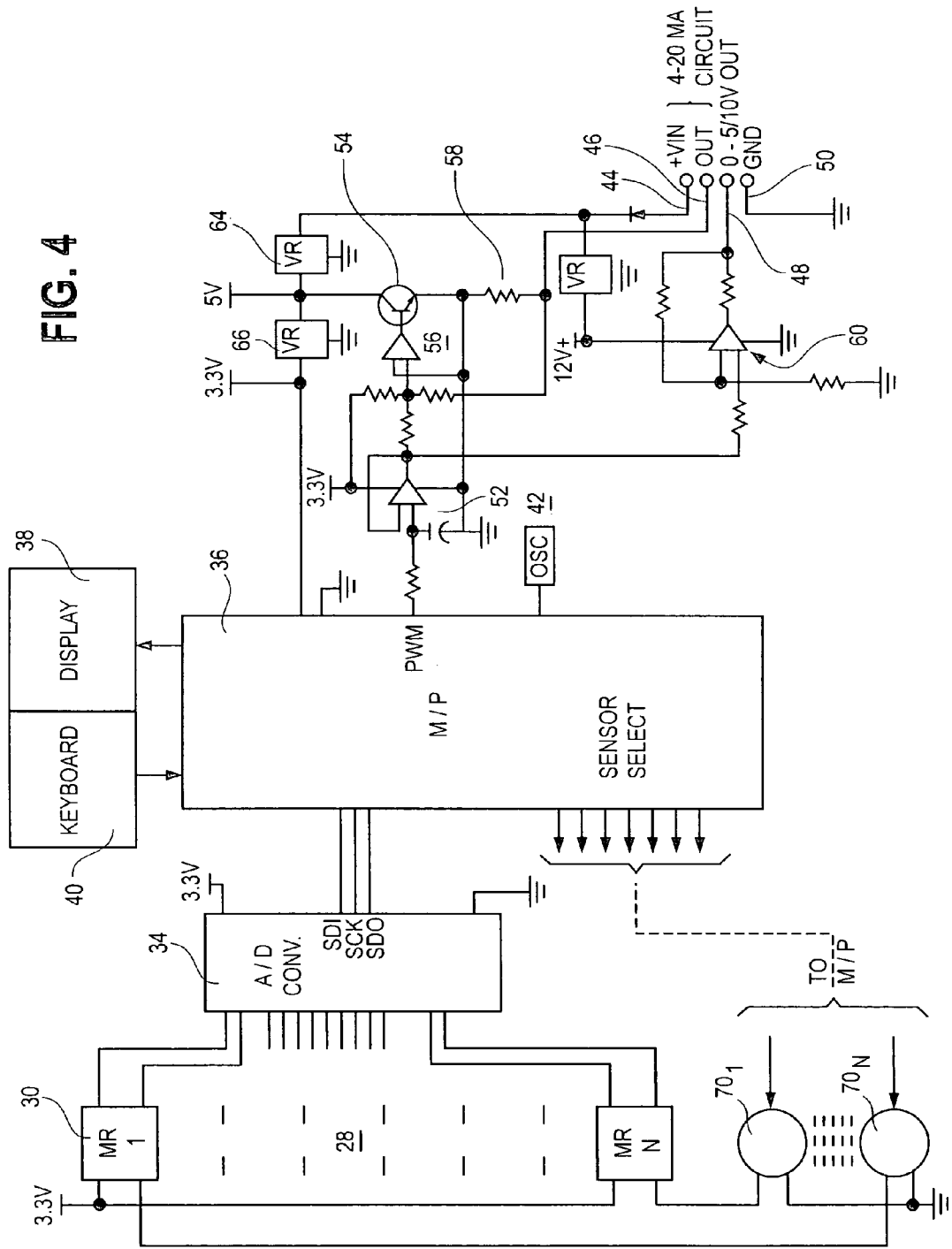
FIG. 4 is a diagram of the circuit of the MR sensor array with signal processing and multiple analog outputs.

The flow chart of FIG. 4 illustrates the operation of microprocessor 36. Upon start up at block 80, the hardware and software are initialized at block 82. Assuming that no key of keyboard 40 is pressed at decision block 84, the sensors 30 of sensor array 28 are read, as discussed above. The digital unbalance signal from each sensor is then normalized to a value between −1 and 1. Under normal operating conditions, only one adjacent pair of sensors, the pair closest to the magnet, has unbalance voltages in the linear zone of the curve in FIG. 3. The unbalance voltage of one sensor is positive and that of the other is negative; and the sensor with the smaller unbalance voltage is the closer to the magnet. This voltage is used in determining the magnet position.

In the event that two adjacent pairs or no adjacent pair of sensors have one positive and one negative unbalance voltage, there is likely an erroneous reading. All unbalance signals for that scan of the sensors are discarded. This situation might occur in several circumstances:
   a) A surge in the fluid flow which causes a sudden movement of the magnet. During a scan of the sensors, the magnet is in two different positions.
   b) Interference from an external magnetic field.
   c) The magnet is beyond the end of the sensor array.

Assuming a valid read at decision block 88, as discussed below, magnet position is calculated from the normalized output of the sensor closest to the magnet and the position of the sensor in array 28 at block 90. The position signal is passed through an infinite impulse response digital filter at block 92. The filter has the following characteristic:

new magnet position=K/100×last magnet position+(1−K)/100×current magnet position, where K is a user programmable filter coefficient.

The resulting position signal is corrected for non-linearity of the flow meter. The linearized position signal is multiplied by the rate coefficient corresponding to the selected display units and the scale factor to calculate flow rate, at block 94. The flow rate multiplied by the time since the last previous measurement is added to the totalizer figure at block 96. At block 98, either the flow rate or the total flow is displayed as selected by the operator. The PWM signal to analog output circuit 42 is updated at block 100. The program then returns to block 84 and repeats.

If more than two pairs of sensors have a positive slope output at decision block 88, an error is flagged to decision block 102. If two consecutive reads of sensor array 28 produce erroneous readings, an error is displayed at block 104.

Keyboard 40 is utilized by an operator to interact with the flow meter. Actuation of Menu or/and Reset keys is detected at decision block 84. Actuation of menu key alone detected at decision block 106 directs the operator to a set-up and calibration sub-routine at block 108. Actuation of reset key alone is detected at decision block 110 and stores the total flow information at block 112. Concurrent actuation of the menu and reset keys is detected at decision block 114 and resets the totalizer to zero at block 116.

Figure 6:
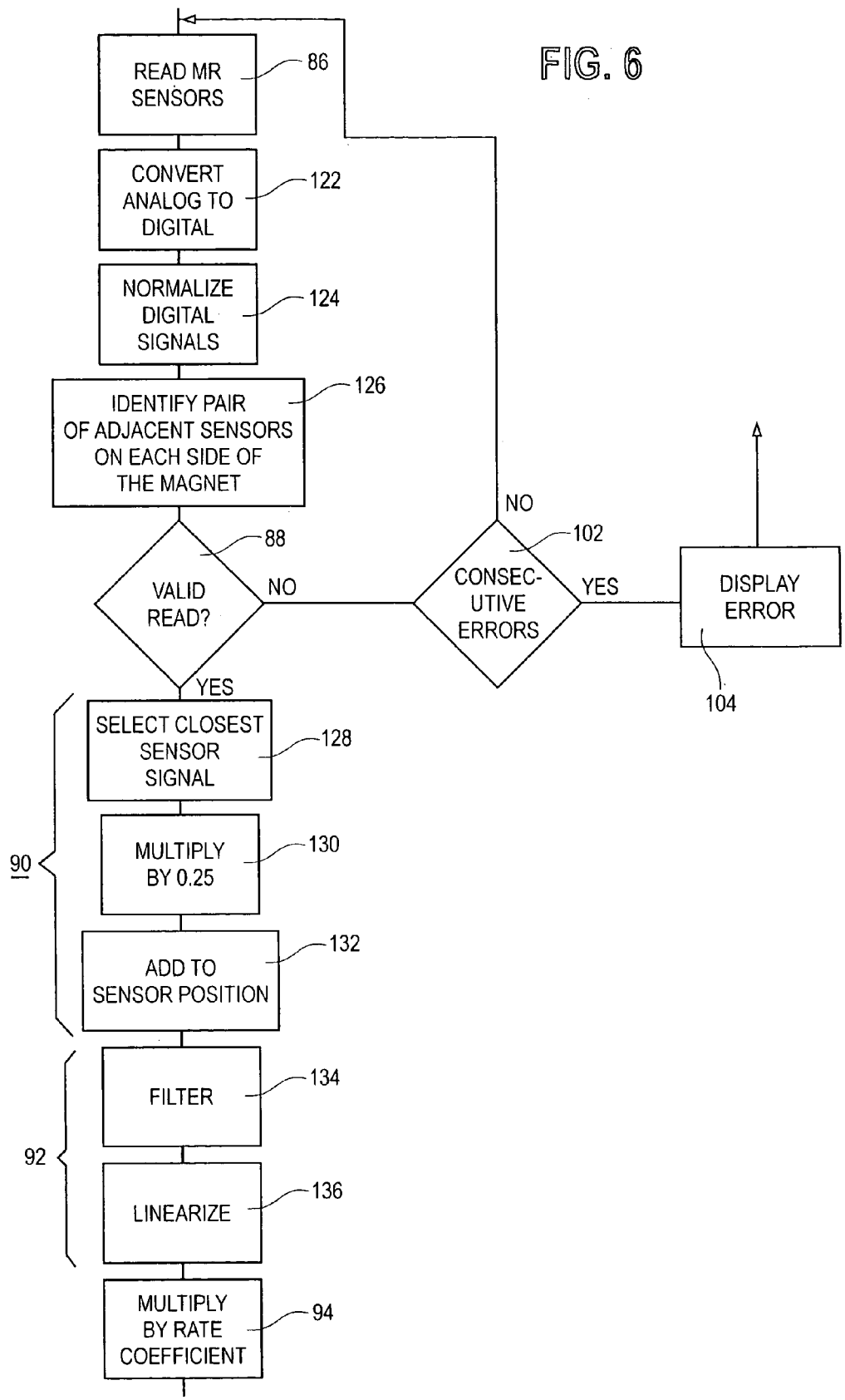
FIG. 6 is a more detailed flow chart of the program for calculating the magnet position and fluid flow.

The calculation of the position of the magnet 26 and of fluid flow, principally by microprocessor 76, are illustrated in more detail in the flow chart of FIG. 6.

Starting at block 86, the unbalance output voltages ΔV of each of the MR sensors 30 are read under control of microprocessor 76. The analog signals are connected with analog to digital converter 34 and the digital unbalance signals are in turn connected with microprocessor 36.

The digital unbalance signals are normalized at block 124. During manufacture, the array 28 of MR sensors mounted on a circuit board is placed in a test fixture and calibrated. A magnet is sequentially positioned at the mid points between adjacent sensors. Analog readings are taken at each position of the minimum and maximum output levels for each sensor. This information is stored in the memory of microprocessor 36 and used to correct for the bridge zero offset and full scale unbalance voltage tolerance deviations of each sensor. The minimum and maximum signal levels for the sensing range of each sensor determined during calibration provide the basis for normalizing the signals read from each sensor. The signals are normalized to a value from −1.0 to +1.0. A normalized value of −1.0 represents the maximum valid negative unbalance signal, corresponding with a magnet position 0.25" from the center of the sensor. A normalized value of +1.0 represents the maximum valid positive unbalance signal, corresponding with the magnet position 0.25" from the center of the sensor on the other side.

At block 126, the pair of adjacent sensors on each side of the magnet are identified by looking for a positive normalized signal from one sensor and a negative normalized signal from the other.

Figure 5:
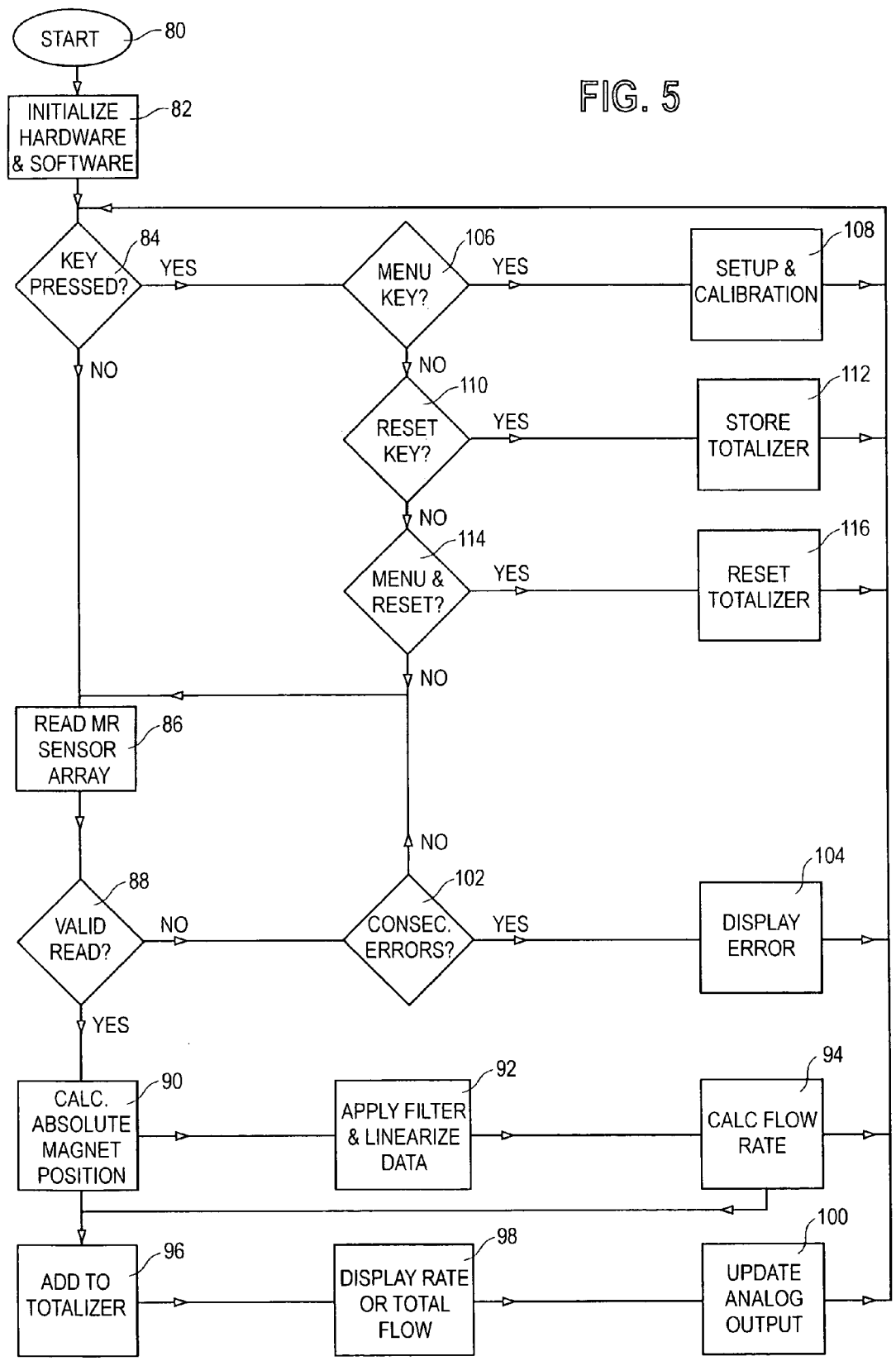
FIG. 5 is a flow chart of the program of the microprocessor.

The validity of the reading is checked at block 88 by determining whether more than one pair of adjacent sensors are identified at block 126. If the reading is valid, the program continues. If the reading is not valid; and this is the first invalid reading, the program returns to block 86 and the sensors 30 are read again. In the event of two or more consecutive errors at block 102, an error display is given and the program returns to block 84 as shown in FIG. 5.

With a valid read, the program continues from block 88 to calculate the magnet position at block 90. The first step is to select the closest sensor of the pair of adjacent sensors on each side of the magnet. This is the smaller of the signals from the pair of adjacent sensors on each side of the magnet. The signal is the smaller of the two, regardless of its sign. The normalized signal is multiplied by 0.25 at block 130 to obtain the distance of the magnet from the sensor of the closest sensor. This distance, which may be positive or negative, depending on the sign of the closest sensor signal is added to the sensor position in the array at block 132.

The position signal is filtered at block 134 and linearized at block 136, as described above.

The flow rate is calculated from the magnet position at block 94 by multiplying the magnet position signal by a rate coefficient for the desired flow dimension, e.g., milliliters per minute, barrels per hour, etc.

The program is completed as illustrated in FIG. 5 and then repeats.

We claim:

1. In a variable area fluid flow meter having a magnet carried by a piston movable by the fluid flow in a linear path against a spring, a flow sensor, comprising:
   a linear array of bridge circuits parallel to the path of magnet movement, each bridge circuit having four magnetoresistive elements, balanced in the absence of magnetic flux and unbalanced by flux from the magnet, the unbalance being a function of the position of the magnet along said path relative to each of the bridge circuits;
   a voltage source connected with the bridge circuits of the array, each bridge having an output voltage representing the unbalance of the bridge; and
   a signal circuit responsive to the output voltages of the bridges of the array to develop a fluid flow signal.

2. The flow sensor of claim 1 wherein the output voltages of the bridge currents are analog and the signal circuit includes:
   an analog to digital converter which converts the analog bridge output voltages to digital signals; and
   a processor responsive to said digital signals to develop the fluid flow signal.

3. The flow sensor of claim 2 in which said processor has an output in pulse width modulated format; and
   an output circuit with an integrator which converts the pulse width modulated processor output to an analog format.

4. The flow sensor of claim 1 in which the fluid flow signal represents flow rate.

5. The flow sensor of claim 1 in which the fluid flow signal represents total flow.

6. The flow sensor of claim 1 in which said output circuit includes a current output section and a voltage output section.

7. In a condition measuring meter having a magnet moveable along a linear path in accordance with the condition to be measured, a condition sensor comprising:
- a linear array of bridge circuits parallel to the path of magnet movement, each bridge circuit having four magnetoresistive elements balanced in the absence of magnetic flux and unbalanced by flux from the magnet, the unbalance being a function of the position of the magnet along said path relative to each of the bridge circuits, each bridge having an output voltage representing bridge unbalance;
- a current based, two-wire remote indicator circuit including a remote power source;
- a local power supply connected through said two-wire circuit with said remote power source and providing local power for the condition sensor;
- a switch circuit powered by said local power supply connecting said bridge circuits with said local power supply, each bridge having an output voltage representing the unbalance of the bridge; and
- a signal circuit powered by said local power supply, responsive to the output voltages of the bridges of the array to develop a signal representing the position of the magnet and thus the measured condition and having a current output section connecting said measured condition signal with said two-wire remote indicator circuit.

8. The condition sensor of claim 7 wherein said switch circuit connects less than all of the bridge circuits of said array to said local power supply at one time.

9. The condition sensor of claim 8 where said switch circuit connects only one bridge circuit of said array with said local power supply at a time.

10. A method of measuring flow of a fluid with a meter which has a magnet movable along a linear path past an array of magnetoresistive bridge sensors, in response to the fluid flow, the sensors each having a fixed position in the array, the bridge sensors having analog unbalance output signals as a function of the position of the magnet with respect to the sensor, comprising:
- reading the analog unbalance signals of the sensors;
- identifying the pair of adjacent sensors on each side of the magnet from the unbalance signals;
- selecting the sensor closest to the magnet;
- calculating the position of the magnet with respect to the selected sensor from the unbalance signal of the selected sensor; and
- adding the calculated magnet position to the position in the array of the selected sensor, to determine the magnet position and the fluid flow.

11. The method of claim 10 including the step of normalizing the unbalance signals prior to identifying the pair of adjacent sensors on each side of the magnet.

12. The method of claim 10 in which the unbalance signals of all of the sensors are read.

13. The method of claim 10 in which the analog unbalance signals of only the sensors closest to the magnet are read.

14. The method of claim 10 including the step of converting the analog unbalance signals to digital form.

15. The method of claim 11 in which the analog unbalance signals are converted to digital form before the signals are normalized.

16. The method of claim 10 in which the validity of the reading of the unbalance signals is confirmed.

17. The method of claim 16 in which the validity of the reading of the signals is confirmed after identifying the pair of adjacent sensors on each side of the magnet.

18. The method of claim 17 in which the reading of the unbalance signals is determined to be invalid if more than one pair of adjacent sensors on each side of the magnet is identified.

19. The method of claim 16 in which the magnet position and fluid flow are not determined if the reading of unbalance signals is not valid.

20. The method of claim 10 including filtering the signal representing the magnet position.

21. The method of claim 20 in which the magnet position signal is filtered with an infinite impulse response filter.

22. The method of claim 21 in which the filter has the characteristic:

new magnet position=K/100×last magnet position+(1−K)/100×current magnet position, where K is the filter coefficient.

23. The method of claim 20 including linearizing the filtered signal.

* * * * *